US009733882B2

United States Patent
Büld et al.

(10) Patent No.: US 9,733,882 B2
(45) Date of Patent: Aug. 15, 2017

(54) APPARATUS AND METHOD FOR COORDINATING VISUAL EXPERIENCES THROUGH VISUAL DEVICES, A MASTER DEVICE, SLAVE DEVICES AND WIDE AREA NETWORK CONTROL

(75) Inventors: Johannes Büld, Gronau (DE);
Benedikt Terhechte, Münster (DE);
Philipp Kirchner, Münster (DE);
Aytek Esen Celik, Mountain View, CA (US)

(73) Assignee: Videro LLC, San Francisco, CA (US)

( * ) Notice: Subject to any disclaimer, the term of this patent is extended or adjusted under 35 U.S.C. 154(b) by 158 days.

(21) Appl. No.: 13/451,495

(22) Filed: Apr. 19, 2012

(65) Prior Publication Data
US 2013/0278483 A1   Oct. 24, 2013

(51) Int. Cl.
| | |
|---|---|
| *G06F 3/14* | (2006.01) |
| *H04N 21/41* | (2011.01) |
| *H04N 21/43* | (2011.01) |
| *H04N 21/845* | (2011.01) |
| *G06F 13/00* | (2006.01) |

(Continued)

(52) U.S. Cl.
CPC ....... *G06F 3/1431* (2013.01); *H04N 21/4122* (2013.01); *H04N 21/4305* (2013.01); *H04N 21/8456* (2013.01); *G06F 3/14* (2013.01); *G06F 3/1446* (2013.01); *G06F 13/00* (2013.01); *G09G 3/2096* (2013.01); *G09G 5/12* (2013.01); *G09G 2320/0693* (2013.01); *G09G 2370/022* (2013.01); *G09G 2370/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,108,687 A | * | 8/2000 | Craig | G06F 17/30873 707/999.001 |
| 7,155,488 B1 | | 12/2006 | Lunsford et al. | |
| 8,005,316 B1 | * | 8/2011 | Linburn et al. | 382/283 |

(Continued)

FOREIGN PATENT DOCUMENTS

JP    2012 049836 A    3/2012

OTHER PUBLICATIONS

Rangan, P. Venkat, Harrick M. Vin, and Srinivas Ramanathan. "Designing an on-demand multimedia service." IEEE Communications Magazine 30.7 (1992): 56-64.*

(Continued)

*Primary Examiner* — Chris Parry
*Assistant Examiner* — Caroline Jahnige
(74) *Attorney, Agent, or Firm* — Cooley LLP

(57) ABSTRACT

A system includes a first digital display, a master content player configured to supply first visual content to the first digital display, a second digital display and a slave content player configured to supply second visual content to the second digital display. The master content player publishes synchronization commands to a synchronization server accessed through a wide area network and the slave content player utilizes the wide area network to access the synchronization server for the synchronization commands. The first visual content on the first digital display is coordinated in a predetermined manner with the second visual content on the second digital display on a segment-by-segment basis.

13 Claims, 9 Drawing Sheets

(51) Int. Cl.
G09G 3/20 (2006.01)
G09G 5/12 (2006.01)

(56) References Cited

U.S. PATENT DOCUMENTS

| | | | |
|---|---|---|---|
| 8,412,841 B1* | 4/2013 | Swaminathan | H04L 65/4084 709/203 |
| 2002/0144262 A1 | 10/2002 | Plotnick et al. | |
| 2003/0069891 A1* | 4/2003 | McClintock | G06F 1/1601 |
| 2005/0086695 A1* | 4/2005 | Keele | H04H 60/06 725/86 |
| 2005/0257748 A1 | 11/2005 | Kriesel et al. | |
| 2006/0074851 A1* | 4/2006 | Nagai et al. | 707/1 |
| 2006/0097954 A1 | 5/2006 | Huang | |
| 2008/0155478 A1* | 6/2008 | Stross | 715/849 |
| 2008/0162668 A1* | 7/2008 | Miller | H04L 65/40 709/219 |
| 2009/0089824 A1* | 4/2009 | Beyabani | 725/17 |
| 2009/0106357 A1* | 4/2009 | Igelman | H04L 65/4076 709/203 |
| 2009/0205008 A1* | 8/2009 | Wollmershauser et al. | 725/131 |
| 2010/0153512 A1* | 6/2010 | Balassanian et al. | 709/208 |
| 2010/0245210 A1* | 9/2010 | Lee | 345/2.1 |
| 2011/0004827 A1 | 1/2011 | Doerr et al. | |
| 2011/0066971 A1 | 3/2011 | Forutanpour et al. | |
| 2012/0075334 A1* | 3/2012 | Pourbigharaz et al. | 345/619 |

OTHER PUBLICATIONS

International Search Report and Written Opinion issued to International Patent Application No. PCT/US13/36992, Aug. 30, 2013, 9 pgs.

Extended Search Report issued to European Patent Application No. 13777757.9, Nov. 2, 2015 12 pgs.

* cited by examiner

APPARATUS AND METHOD FOR COORDINATING VISUAL EXPERIENCES THROUGH VISUAL DEVICES, A MASTER DEVICE, SLAVE DEVICES AND WIDE AREA NETWORK CONTROL

FIELD OF THE INVENTION

This invention relates generally to coordinated visual experiences, such as through displays, lights and a projector. More particularly, this invention is directed toward the coordination of visual experiences through visual devices, a master device, slave devices and wide area network control.

BACKGROUND OF THE INVENTION

Digital displays are increasingly popular. A digital display is an output device for presentation of visual information. The digital display may be a flat panel display, a computer monitor, or a large-screen television (e.g., a JumboTron®). The digital display may be implemented using a number of display technologies, such as light-emitting diode, electroluminescent, plasma or liquid crystal display technologies.

Current digital display implementations are generally uncoordinated. For example, consider the case of Times Square in New York City. Various digital displays owned by different entities present uncoordinated content. A single entity may control adjacent digital displays, but the coordination between such adjacent digital displays requires a dedicated solution, typically through hard-wired connections or a local area network. This approach is expensive and does not otherwise scale.

In view of the foregoing, it would be desirable to provide new techniques for coordinating visual experiences on visual devices, such as digital displays.

SUMMARY OF THE INVENTION

A system includes a first digital display, a master content player configured to supply first visual content to the first digital display, a second digital display and a slave content player configured to supply second visual content to the second digital display. The master content player publishes synchronization commands to a synchronization server accessed through a wide area network and the slave content player utilizes the wide area network to access the synchronization server for the synchronization commands. The first visual content on the first digital display is coordinated in a predetermined manner with the second visual content on the second digital display on a segment-by-segment basis.

Another system has a master to control an audio and visual experience and a set of slaves controlling a set of individually controlled audio devices and visual devices, such as a projector, a light, a digital display, a sign, and a speaker. The master publishes synchronization commands to a synchronization server accessed through a wide area network and the slaves utilize the wide area network to access the synchronization server for the synchronization commands. Consequently, the audio and visual experience is coordinated in a predetermined manner by the slave devices on a segment-by-segment basis. Each segment is a specified setting for the individually controlled audio devices and visual devices.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
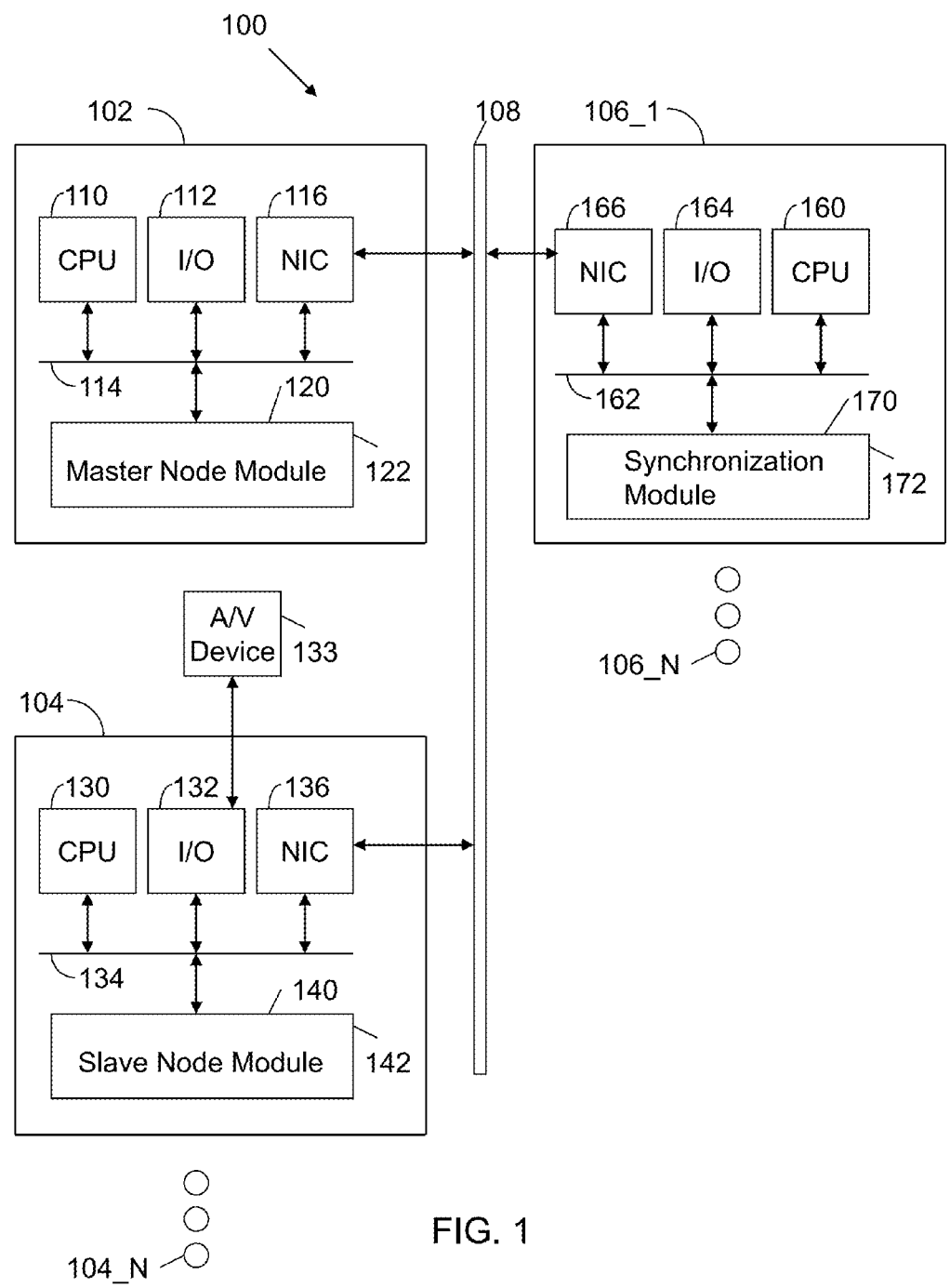
FIG. 1 illustrates a system configured in accordance with an embodiment of the invention.

FIG. 1 illustrates a system 100 configured in accordance with an embodiment of the invention. The system 100 includes a master device 102, a set of slave devices 104 and at least one server 106 connected via a network 108, which may be any wired or wireless network. The network 108 is a wide area network, which is a telecommunication network that covers a broad area (e.g., a network that links across metropolitan, regional or national boundaries). The server 106 may be resident anywhere. The master device 102 and slave devices 104 are typically positioned near the venue of a visual experience coordinated in accordance with the invention. The visual experience may include coordinated audio content.

The master device 102 includes standard components, such as a central processing unit 110 and input/output devices 112 linked by a bus 114. The input/output devices 112 may include a keyboard, mouse, display and the like. Alternately, the input/output devices 112 may be omitted and the master 102 may operate as a computer appliance. A computer appliance is a discrete hardware device with integrated software or firmware designed to provide a specific computing resource. The hardware and software are pre-integrated and pre-configured to provide a specific solution to a particular problem, in this case presenting a coordinated visual experience.

The master device 102 also includes a network interface circuit 116, which provides connectivity to network 108. A memory 120 is also connected to bus 114. The memory stores executable instructions to implement operations of the invention. In one embodiment, a master node module 122 is stored in memory 120. The master node module 122 implements operations for coordinating a visual experience. The visual experience may be coordinated across a number of slave devices, which control different visual displays. Synchronization between the master device 102 and the slave devices 104 is through the server 106, which is accessed by all devices through the wide area network 108. The master node module 122 sends synchronization commands to the server 106. The synchronization commands are then observed by the slave devices 104. On a segment-by-segment basis, the master node module 122 specifies a setting for an audio or visual device controlled by a slave device 104, as discussed below. In one embodiment, the master node module includes a media player that drives content and its interactivity across displays, sound systems, lighting systems and other devices controlled by the slave devices.

Each slave device 104 also includes standard components, such as a central processing unit 130 and input/output devices 132 linked by a bus 134. The input/output devices 132 may include a keyboard, mouse, display and the like. In addition, the input/output devices 132 may include a port for connection to an audio or visual device 133. In one embodiment, the slave device 104 is implemented as a computer appliance with a port for connection to a controlled audio or visual device 133. The controlled audio or visual device 133 may be a projector, a light, a digital display, a sign and/or a speaker. The master 102 may also control an audio or visual device 133.

The slave device 104 also includes a network interface circuit 136, which provides connectivity to network 108. A memory 140 is also connected to bus 134. The memory 140 stores a slave mode module 142. The slave mode module 142 includes executable instructions to communicate with the server 106 to secure synchronization information. The slave node module also includes a playlist. The playlist is a set of control signals for application to an audio or visual device 133. For example, the playlist may specify a list of programs and/or compositions. The slave mode module 142 executes the playlist in accordance with synchronization information received from server 106, as discussed below. The master 102 may also store and execute a playlist.

The server 106 also includes standard components, such as a central processing unit 160 and input/output device 164 connected by a bus 162. The server 106 also includes a network interface circuit 166 to establish a link with network 108. The server also includes a memory 170 connected to the bus 162. The memory 170 stores a synchronization module 172. The synchronization module 172 includes executable instructions to synchronize a visual experience in response to instructions received from the master device 102 and delivered to the slave devices 104. The synchronization module 172 also includes executable instructions to supply graphical user interfaces (GUIs) to solicit input for coordinated visual experiences, as discussed below. Each GUI may be received from the master node module 122 or may be resident on server 106. Preferably, the synchronization module 172 is internet accessible so that GUIs may be delivered to any networked device. In this way, parameters associated with the master 102 and slave 104 may be controlled by any number of networked devices.

As previously indicated, server 106 is resident in a wide area network. In this way, it is "in the cloud" and therefore is readily accessible by the master device, the slave devices and other control devices. The operations of the server 106 may be distributed across many servers 106_1 through 106_N. Thus, the system is easily scalable by adding new nodes in the cloud.

Figure 2:
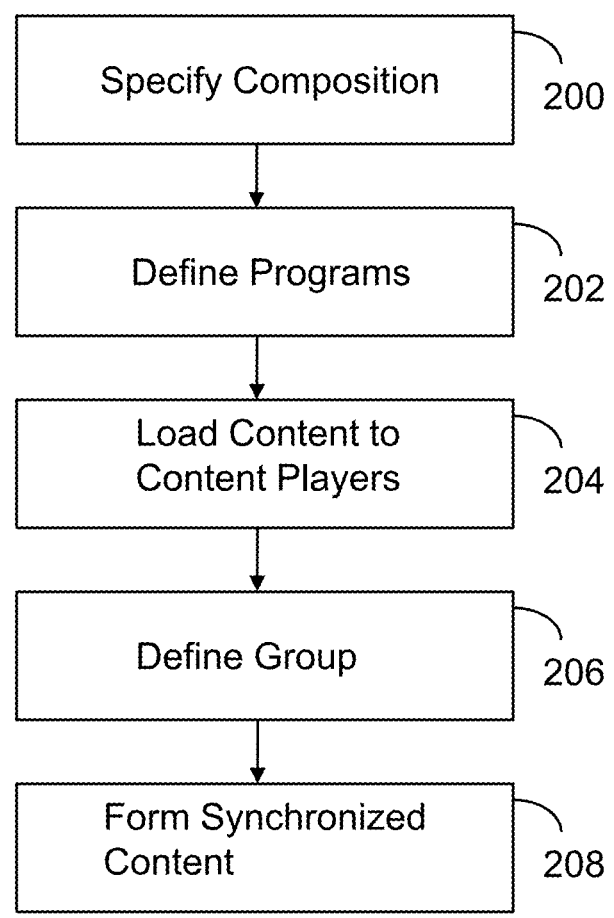
FIG. 2 illustrates processing operations associated with an embodiment of the invention.

FIG. 2 illustrates processing operations associated with an embodiment of the invention. Initially, a composition is specified 200. A composition is a sequence of commands for an audio or visual device. Each command may have associated content or an associated parameter. For example, a command may be to turn on a light and an associated parameter may be a dimmer value. Alternately, a command may be to play a soundtrack, where the associated content is a specified soundtrack and the associated parameter is a volume level. A composition may be an arrangement of visual components. The visual components may be selected from text, images, videos and/or animations. In one embodiment, a composition is a set of video, audio, Internet content and/or sensor-triggered multimedia content.

Next, programs are defined 202. A program is a series of compositions. Content is then loaded to content players 204. Content may be a composition, compositions, a program and/or programs. The content players include a master 102 and at least one slave 104. The master 102 may control an associated audio or visual device or may simply operate as a control device. Each slave 104 may store the same or different content.

A group is then defined 206. A group includes a master 102 and at least one slave 104. Synchronized content is then formed 208. In one embodiment, the master node module 122 assigns a synchronization command on a segment-by-segment basis, where a segment is a command within a composition. Alternately, the master node module 122 or another networked machine supplies a GUI to a user, which allows the user to specify a synchronization command on a segment-by-segment basis, so, for example, a composition on one slave device is coordinated with a composition on the master device and each additional slave device in a group. These operations are more fully appreciated with reference to FIG. 3.

Figure 3:
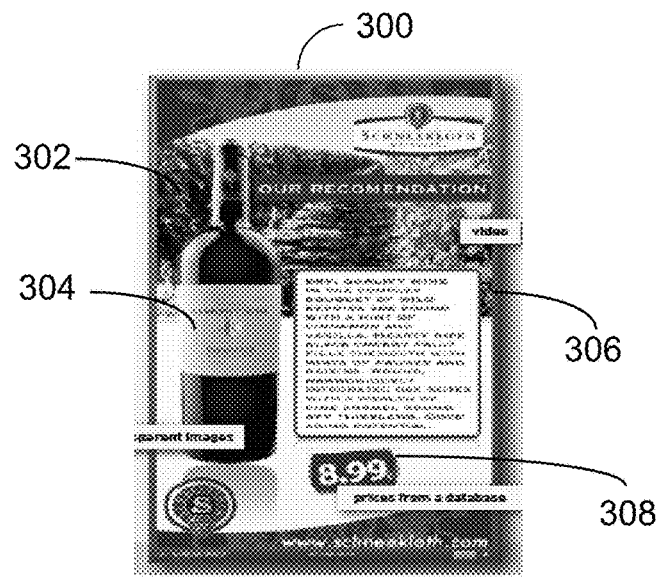
FIG. 3 illustrates a composition processed in accordance with an embodiment of the invention.

FIG. 3 illustrates a visual composition 300. In this example, the visual composition 300 includes a variety of content. Each content component may have a different source (e.g., a different network source specified by a Uniform Resource Locator). The visual composition 300 may include a base image 302, an additional image 304, a scrolling video 306 and a price 308 fetched from a database. Thus, in this example, composition 300 may be thought of as a web page with various linked content. The composition may be text, an image, a video or an animation; alternately, the composition may be any combination of such elements.

Figure 4:
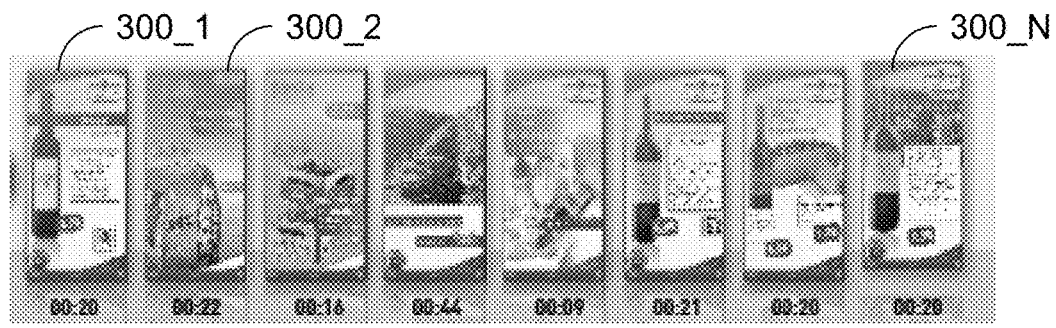
FIG. 4 illustrates a series of compositions forming a program processed in accordance with an embodiment of the invention.
Figure 5:
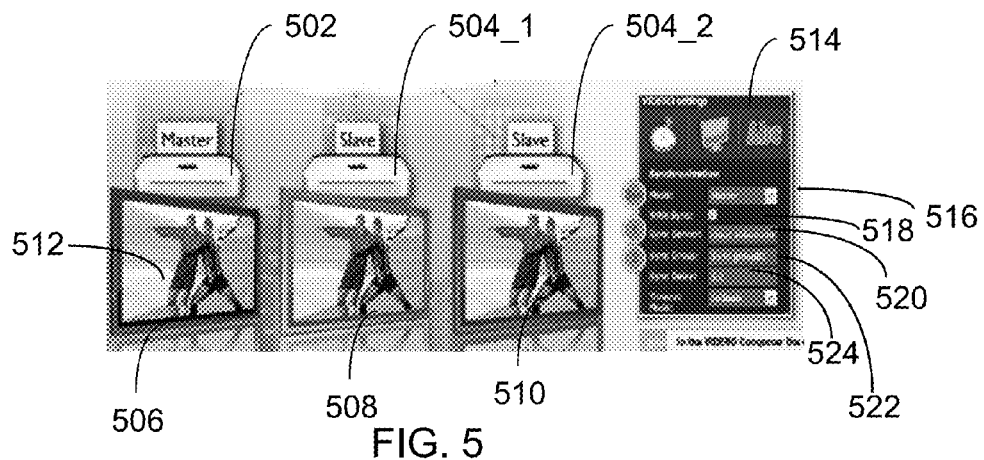
FIG. 5 illustrates the display of coordinated content in accordance with an embodiment of the invention.

FIG. 4 illustrates composition 300_1 corresponding to composition 300 of FIG. 3 and additional compositions 300_2 through 300_N, which form a series of compositions, referred to herein as a program. Suppose now that it is desired to play this single program or another program on a variety of displays in a coordinated manner. FIG. 5 illustrates how this is accomplished in accordance with an embodiment of the invention.

FIG. 5 illustrates a master 502, a first slave 504_1 and a second slave 504_2. The master 502 is connected to display 506, while slave 504_1 is connected to display 508 and slave 504_2 is connected to display 510. Composition 512 is presented on each display.

FIG. 5 also illustrates a GUI 514, which may be supplied by the master node module 122 or the synchronization module 172. Alternately, the GUI 514 is supplied by another networked machine, such as server 106_N. In another embodiment, the GUI 514 is resident as a web based application on a user machine, which allows access and control of the master device and slave devices in a group.

The GUI 514 allows one to define a group to deliver coordinated content. In one embodiment, the GUI 514 allows one to specify various synchronization parameters 516, 518, 520, 522 and 524. For example, one synchronization parameter may specify a master control mode. The master control mode is specified using any unique identifier. Another synchronization parameter may specify synchronization through a wide area network. Another implementation allows synchronization through a local area network.

Another synchronization parameter may define the address (e.g., IP address) for a synchronization server. In one embodiment, the address for the synchronization server is pre-programmed into each master and slave device.

Another synchronization parameter may define a name (e.g., a synchronization group or sync group) shared by a master and a set of slave devices. The sync group identifier is any unique identifier. Still another synchronization parameter may define a synchronization delay, which defines the interval between synchronization commands. The synchronization delay is used to account for the delay interval in sending a command and receiving a command due to different network connection speeds, node processing speeds and the like. Finally, a timeout mode synchronization parameter may be defined, which specifies that a slave device should exercise local content control.

Thus, the GUI 514 allows one to define which displays and which compositions or programs will be synchronized. A display in this context includes any output system, such as a sound system, a light system or other show control device. Any combination of unique identifiers may be used to specify a program or composition, a sync group, a sync server, and individual components within a program or composition. The identifiers may be assigned automatically or through user control.

In one embodiment, multiple synchronization groups are supported by a single server. Each synchronization group has one master. In one embodiment, the server has a connection table for each sync group. Once a device connects to a sync group, its connections are inserted in the table for the sync group. When a client connects to the server, it sends a message indicating whether it is a master or a slave, its authentication and the sync group that it wants to connect to. This data is checked against an authentication database. If authenticated, the client is added with the appropriate role to the connection table of the sync group. Preferably, the synchronization module 172 supports internet access from any networked device to allow configuration of a sync group.

In one embodiment, when a master sends a message to the server, it is relayed to every slave in the sync group. The server may be implemented with a push model where information is pushed to slave devices or in a pull model where slaves are allowed to pull information from the server.

Figure 6:
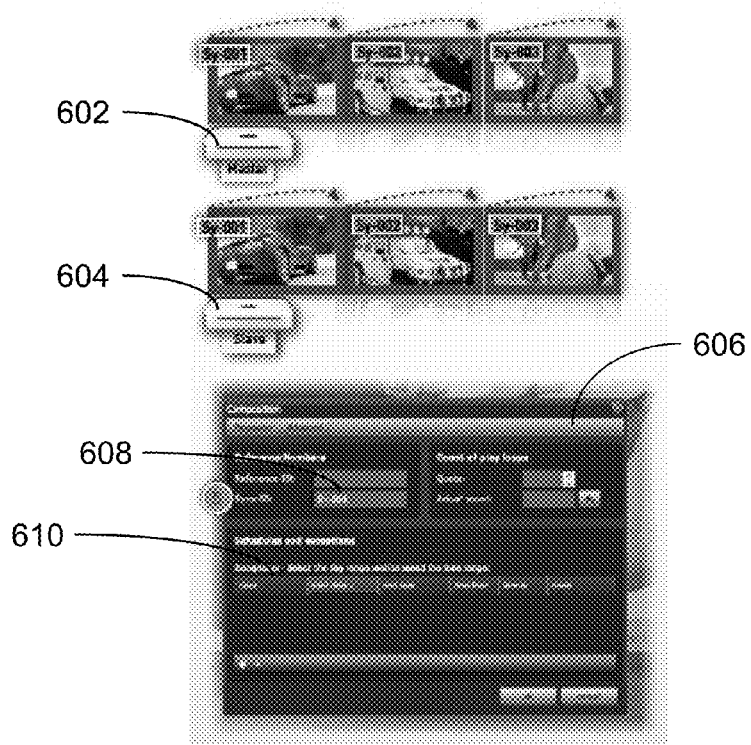
FIG. 6 illustrates synchronization operations utilized in accordance with an embodiment of the invention.

FIG. 6 illustrates a master 602 playing a sequence of compositions with segment-specific synchronization identifications Sy-001, Sy-002 and Sy-003. Similarly, slave 604 plays an identical sequence of compositions. FIG. 6 also illustrates a GUI 606, which may be used to assign a synchronization identification (sync id) to a composition. In this example, a block 608 is provided to specify a sync id. The GUI 606 may also include a block 610 to specify composition schedule and exception parameters. For example, composition schedule parameters may include a start date, an end date, a time from and a time to parameter.

Thus, each composition has a common sync id. Compositions that have the same sync ID (on different players) are played in synchronization, independent of the actual content.

When the master is playing a composition, the original sync id from the master is continuously published to the address of the server. For example, the published content may specify the address of the server, the synchronization group and the sync id. All slave devices subscribe to the same server address. The corresponding compositions on all slave devices are played in accordance with the specified sync id.

Figure 7:
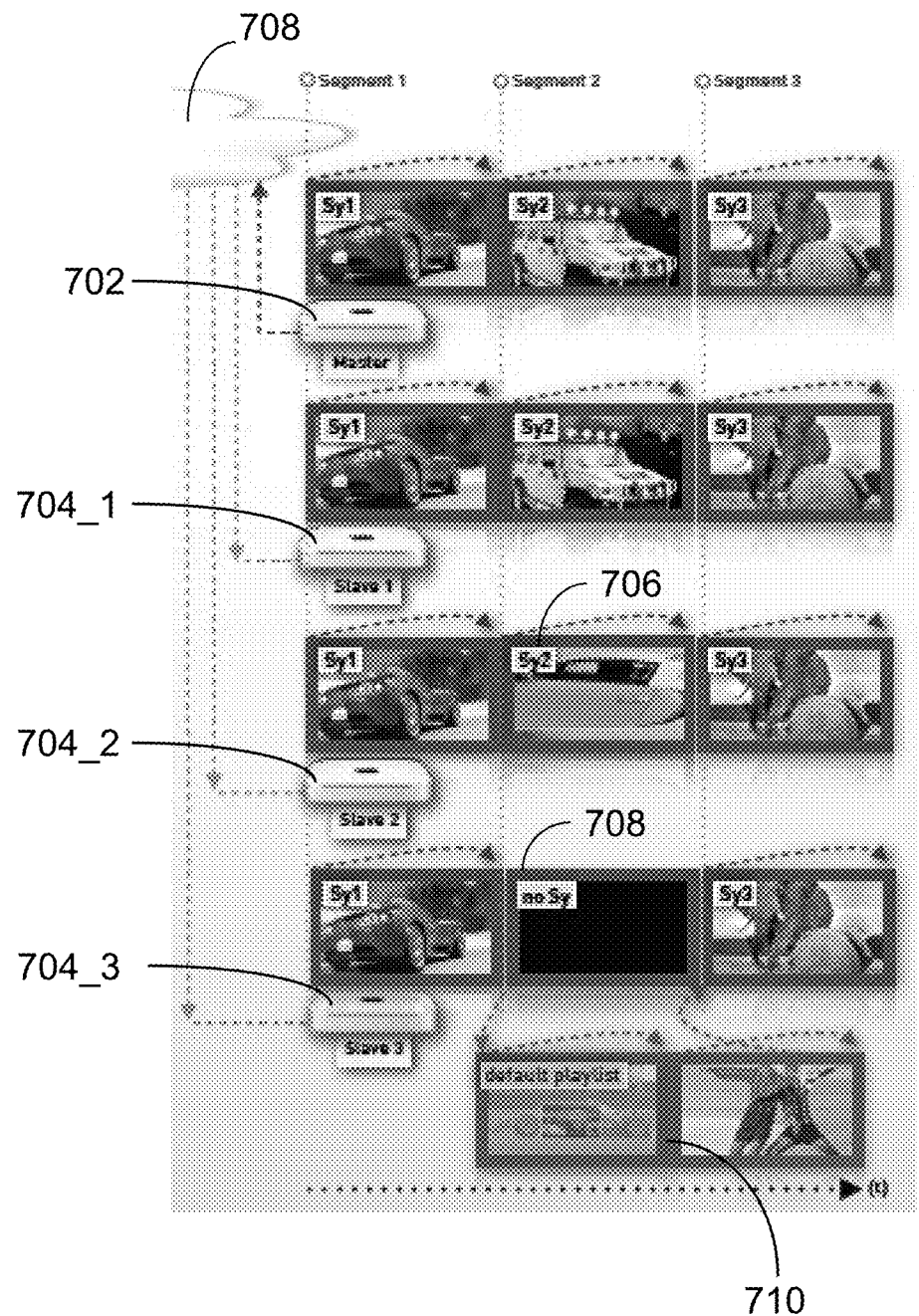
FIG. 7 illustrates wide area network synchronization operations utilized in accordance with an embodiment of the invention.

FIG. 7 illustrates a master 702 communicating with a set of slaves 704_1, 704_2 and 704_3 through a wide area network 708. In this example, master 702 and slave 704_1 play identical segments with sync ids of Sy1, Sy2 and Sy3. Slave 704_2 has unique content 706 for sync id Sy2. Slave 704_3 misses sync id Sy2 (e.g., due to a network fault). As discussed in connection with FIG. 8, this may result in the invocation of alternate content 710 stored by the slave 704_3.

Figure 8:
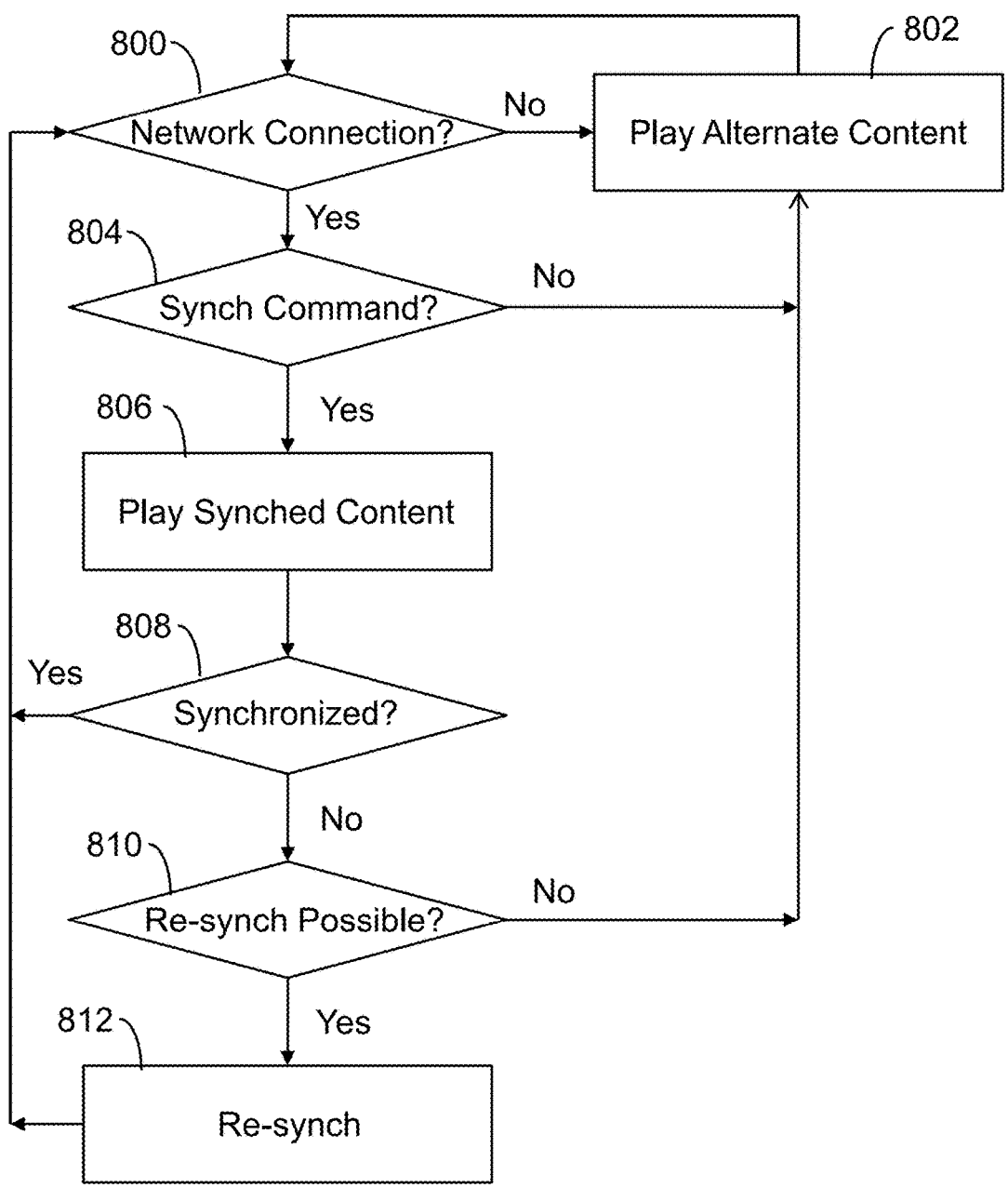
FIG. 8 illustrates synchronization and alternate content invocation operations associated with an embodiment of the invention.

FIG. 8 illustrates processing operations associated with an embodiment of the invention. In particular, the figure illustrates synchronization operations implemented by the slave node module 142. Initially, the slave node module 142 checks to determine if the slave has a network connection 800. In particular, if there is a network connection to a specified synchronization server. If not, alternate content is played 802. In one embodiment, the slave node module 142 maintains a list of programs. The list of programs may include a fallback program, a previous program and a next program. The slave node module 142 may select one of these programs based upon one or more specified or default rules.

If a network connection does exist (800—Yes), then the slave node module 142 looks for a synchronization command 804. If one does not exist, control returns to block 802. If a synchronization command exists (e.g., a sync id for a specified program), then the synchronized content is invoked from the play list and is played 806. If the synchronization is successful (808—Yes), then control returns to block 800. If not (808—No), the slave node module 142 determines if a re-synchronization is possible 810. Various criteria may be specified to establish whether a re-synchronization is possible. One criterion may be whether a video can be advanced from an existing frame to an adjacent frame within some time specified time period. If such a re-synchronization is not possible (810—No), the alternate content is played 802. If such a re-synchronization is possible (810—Yes), then the content is re-synchronized 812 and control returns to block 800.

The processing of FIG. 8 addresses the problem of synchronized video simultaneously executing on displays that have different characteristics (e.g., different CPU speeds, different graphic cards, power outages, network outages and the like). The invention provides continuous synchronization throughout the running of a video. Consequently, on a faster-than-frame basis videos on multiple displays are constantly re-synching. This is accomplished without flickering or otherwise going out of frame synchronization. Even if one display loses power or a network connection, when the problem is resolved, the system immediately returns to displaying the correct segment (e.g., video location) in synchronization with the other displays.

Figure 9:
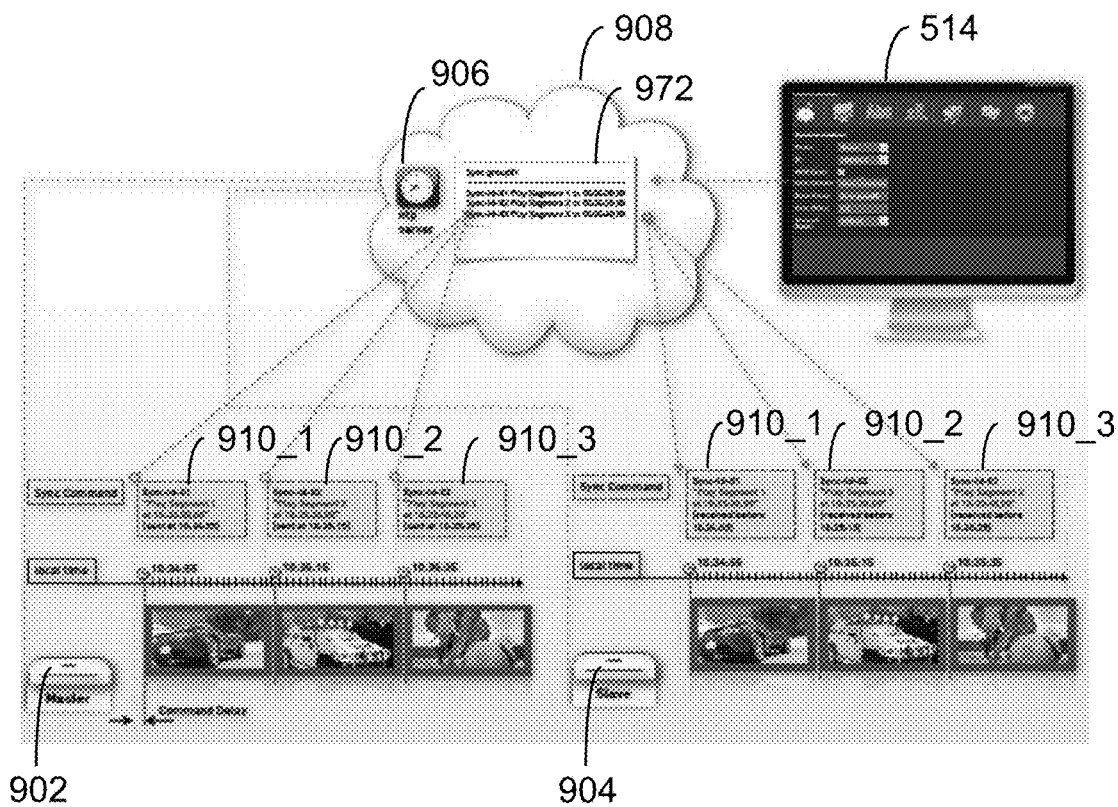
FIG. 9 illustrates wide area network synchronization operations utilized in accordance with an embodiment of the invention.

These operations are more fully appreciated with reference to FIG. 9. FIG. 9 illustrates a synchronization server 906 in a wide area network ("the cloud") 908. The synchronization module 172 stores a set of synchronization commands 972. The synchronization commands 972 are associated with a group of master and slave devices, as specified in GUI 514 of FIG. 5. In this example, the synchronization commands 972 include a sync id, a program segment number (e.g., a specified program and a specified segment of the program) and a time to play the program segment.

The master device 902 generates individual synchronization commands 910_1, 910_2, and 910_3, which correspond to the synchronization commands 972 at server 906. The slave device 904 observe (through a push or pull model) the server 906 for the synchronization commands 972. Synchronization commands 910_1, 910_2 and 910_3 are received by the slave 904. A master clock maintained by the server 906 may be accessed by the master 902 and slave 904.

The master sends a message to indicate when synchronization begins. In one embodiment, the master sends a play/replace command to the server some specified number of seconds before it actually needs to get executed, as shown in FIG. 9. Also sent is a timestamp indicating when the segments needs to be executed and the sync id for which the command is valid. Preferably, the master continuously sends messages with sync ids for currently playing content. In one embodiment, each slave calculates the differences between the master video timeline and its own timeline. This may be done by looking at the timestamp of the master and the timestamp of the video at that time. If this difference reaches a set threshold, the slave adjusts the timeline of its video to lower this difference.

Figure 10:
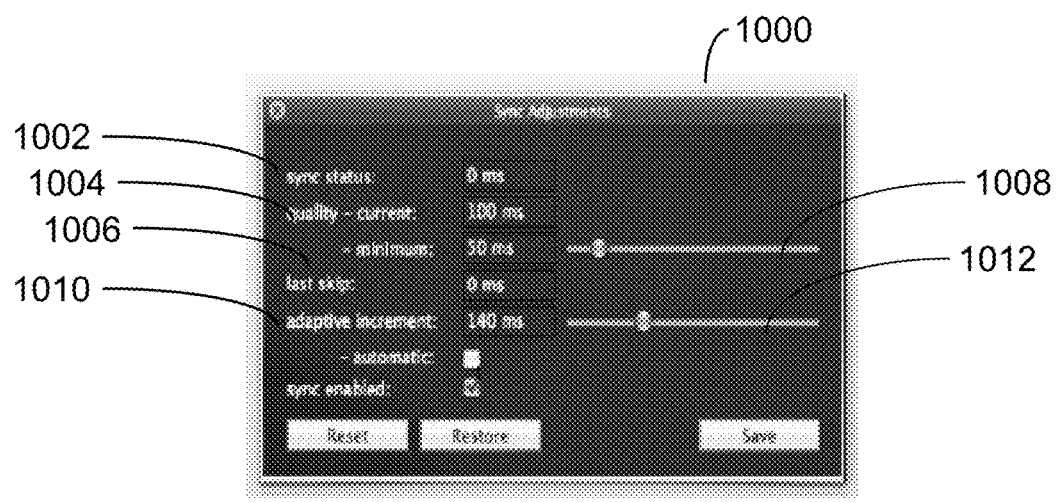
FIG. 10 illustrates synchronization gap processing utilized in accordance with an embodiment of the invention.

FIG. 10 illustrates a synchronization GUI 1000 that may be utilized in accordance with an embodiment of the invention. The GUI 1000 may be supplied by the master 104 and then be accessed at server 106. Alternately, the GUI 1000 is supplied by another networked machine in system 100. In one embodiment, the synchronization GUI 1000 includes synchronization status information 1002. The synchronization status specifies how close the video location of the slave video is to the master video.

A quality parameter 1004 and a minimum quality setting 1006, which may be adjusted with a slider 1008, are also provided. The minimum quality setting specifies a value (e.g., in milli-seconds) within which all synchronized content must operate (e.g., with respect to the content on the master device). An adaptive increment value 1010 may also be defined and adjusted with slider 1012. The adaptive increment value specifies the permissible jump distance (e.g., measured in milli-seconds) for content at a slave device. The adaptive increment is preferably set at a rate where the human eye cannot detect the subtle difference between the video locations on adjacent displays or on the same display. As long as the sync status meets a minimum quality threshold, the slave will not correct itself.

Figure 11:
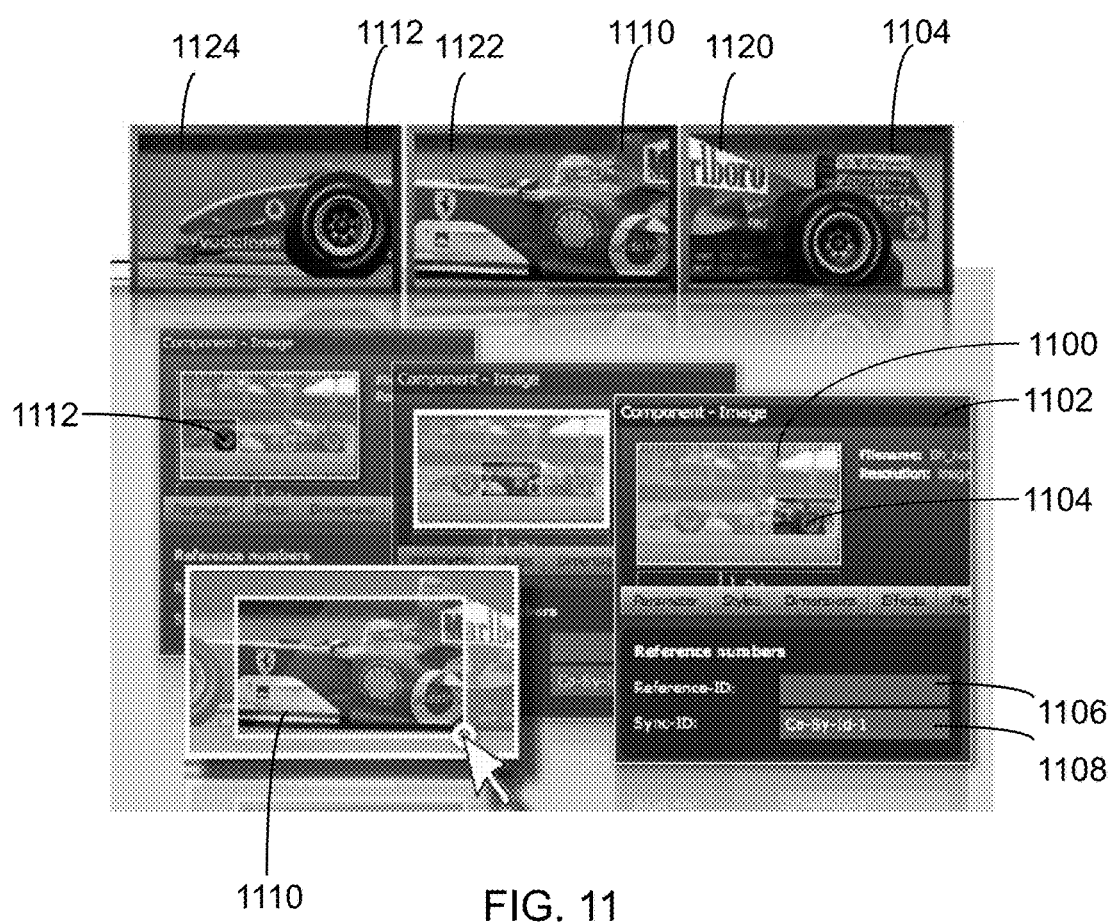
FIG. 11 illustrates intra-frame cropping and synchronization operations employed in accordance with an embodiment of the invention.

FIG. 11 illustrates another technique that may be utilized in accordance with an embodiment of the invention. The master node module 122 or the synchronization module 172 may supply a GUI that is accessible at the server 106. The GUI includes a cropping tool to allow a user to crop individual segments of a frame of content. The individual segments may then be assigned a common synchronization identification. The individual segments may then be simultaneously displayed on different digital displays.

Consider image 1100 in GUI 1102. An image segment 1104 may be specified with an image cropping tool. In this example, the image cropping tool operates on the x-axis and the y-axis of a video (not the z-axis, which is associated with time). The same x-axis and y-axis cropping may be performed in connection with still images or other media elements. The GUI 1102 may include reference identification information, such as a reference id 1106 and a sync id 1108. Additional segments 1110 and 1112 are then cropped from the same image. These additional segments are assigned the same reference id and sync id. Thereafter, the segments 1104, 1110 and 1112 may be synchronously presented on individual displays 1120, 1122 and 1124.

The content on displays 1120, 1122 and 1124 is rendered on-the-fly, without traditional pre-processing or preparation of separate video files for each display. The on-the-fly rendering and the cropping functionality enable reliable high count, multiple screens and synchronized displays. For example, as shown in FIG. 11, a single video can appear to be displayed split across a grid of displays.

The cropping tool may provide drag-and-drop functionality that allows a user to select a particular area of any media component. As shown in FIG. 11, the cropping tool can be used to select the viewing area of the video for each individual display. This allows the user to work with a single video file instead of having to create and manage separate video segments for each display. The cropping and all other edits to components in a composition are non-destructive (i.e., they do not change the source media files).

The cropping tool allows a user to account for physical space between displays (e.g., walls or dividers) and to omit the corresponding areas of the video that account for those physical dividers. This results in the viewer seeing the resulting video in the correct visual perspective, regardless of the number of displays, the physical space between the displays and the dimensions or aspect ratios of the displays.

Each display shows a particular area of the original source file. When all the displays are seen together, the sum of the cropped areas (together with any physical space between the actual screens) add up to create the entire video display.

Embodiments of the invention have been described in the context of set playlists. Programs in the playlist may be rotated in the event of a failed network connection or a synchronization fault. Content may also be altered in response to dynamic input. The dynamic input may be from any number of sources. For example, a sensor may provide the dynamic input. The sensor may sense the existence of an individual or set number of individuals passing the sensor. The sensor may require tactile contact. The sensor may trigger on the absence of light. The sensor may be responsive to radio frequency identification (rf id). For example, a sensor may be associated with a display. The presence of a specified rf id proximate to the display may be used to invoke and play a pre-selected video. Any number of sensor inputs may be used to alter the coordinated visual experience.

Similarly, the dynamic input may be from a digital device, such as an infrared or WiFi signal from an electronic device. The digital device may be in the form of kiosk or other computing device that receives user input. Another form of dynamic input may be a monitored parameter on a networked device. For example, the monitored parameter may be a temperature sensor electronically linked to the wide area network. Alternately, the monitored parameter may be a network accessible value, such as a database entry or a network event (e.g., a social network event, such as a "Like" on Facebook® or a "Tweet" on Twitter®).

Figure 12:
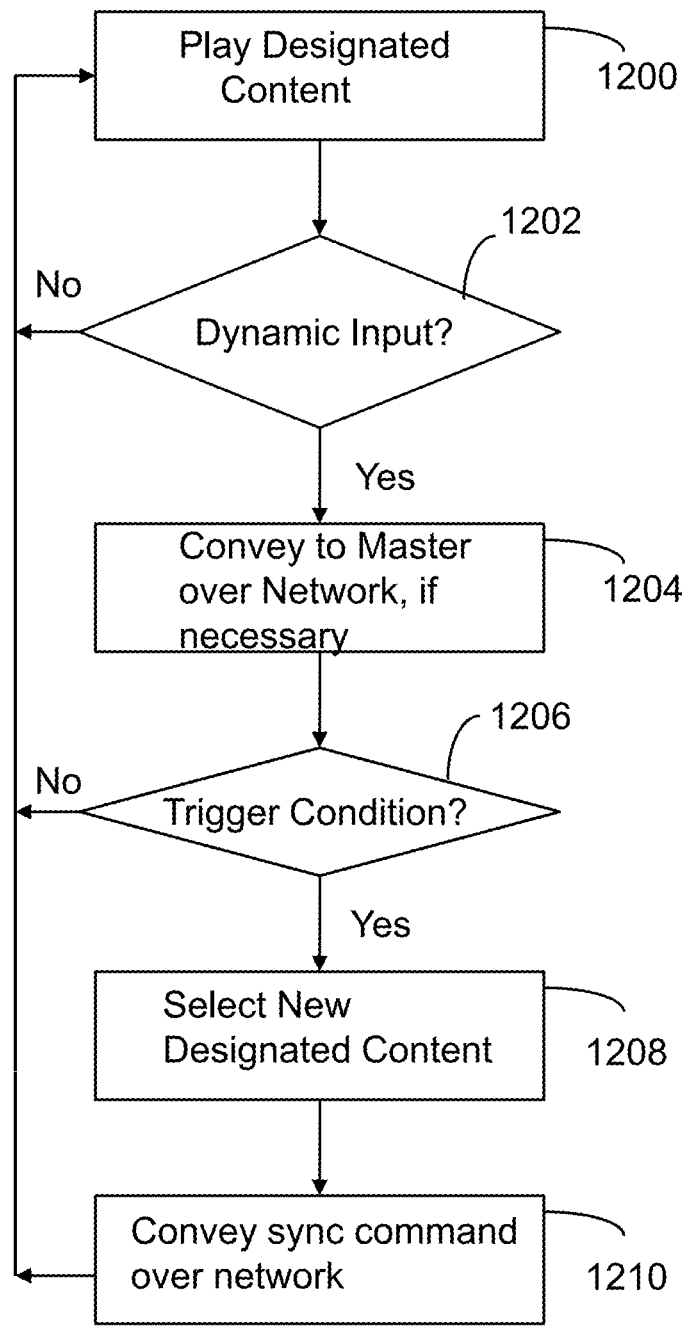
FIG. 12 illustrates content control and selection in response to dynamic input in accordance with an embodiment of the invention.

FIG. 12 illustrates processing operations associated with a system that receives dynamic input. Designated content is played 1200. A check is made for dynamic input 1202. If no dynamic input exists (1202—No) control returns to block 1200. If dynamic input exists (1202—Yes), then the dynamic input is conveyed to the master over the wide area network (e.g., through server 106), if necessary 1204. This may not be necessary in the event that the master receives the dynamic input.

The master evaluates whether the dynamic input satisfies a trigger condition (e.g., exceeds a specified threshold) 1206.

If not (1206—No), control returns to block 1200. If so (1206—Yes), new designated content is selected 1208. For example, the next designated content may be the next program or composition in a playlist. Alternately, the next designated content may be a parameter, such as a command to increase the volume of a speaker, a command to dim a light or a command to activate a sign. A synchronization command associated with the new designated content is then conveyed over the wide area network 1210. That is, the master sends the command to the server 106, where it is accessed by slaves 104.

The invention has been described in connection with a coordinated visual experience on multiple displays. The techniques of the invention may be used to provide any number of coordinated visual experiences. Consider, for example, a first slave device used to control lighting in a retail store. Another slave device controls a projector, which displays an image on a wall of the retail store. Another slave device controls the music delivered to a speaker in the retail store. Another slave device controls a flat screen display. Another slave device is connected to a kiosk to receive dynamic input. Still another slave device is connected to a sign in the retail store.

The master device observes a set of rules and settings based upon dynamic input. For example, the kiosk may receive a selection of a video, which is then displayed on the flat screen display. The selected video may be associated with an image to be displayed by the projector and a set of lighting conditions. The master sends commands to the respective slave devices to implement the specified rules and settings. Alternately, the master device may sequence the slave devices through a series of coordinated settings involving lighting, projections, video, music and the like.

The techniques of the invention may be deployed in any number of ways. For example, a coordinated visual experience may be created across displays that have different dimensions, different aspect ratios and different screen resolutions. It should also be appreciated that the connection between the wide area network and the master and slave groups can be established in any number of ways, including cable, DSL, satellite, mobile 3G or 4G connections or any other type of internet network connection.

It should be appreciated that the techniques of the invention allows for coordinated or synchronized content in any number of combinations. For example, identical compositions or programs may be played on multiple displays. Different compositions or programs may be played on multiple or different displays. A particular composition or program may be displayed (as if it were a single image) split across multiple displays, as shown in FIG. 11. Any video content within a composition or program can be synchronized to the level of frame accuracy.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
   a first digital display;
   a master content player configured to supply first visual content to the first digital display;
   a second digital display; and
   a slave content player configured to supply second visual content to the second digital display, wherein the second visual content is different than the first visual content and the second visual content is stored at the slave content player as a playlist including a reference to a network source;
   wherein the master content player publishes synchronization commands to a synchronization server accessed through a wide area network and the slave content player utilizes the wide area network to access the synchronization server for the synchronization commands and the network source to fetch a component of the second visual content, wherein the synchronization commands include a synchronization identifier associated with a segment of the first visual content and a segment of the second visual content and a time to play both the segment of the first visual content and the segment of second visual content, such that the first visual content on the first digital display is coordinated with the second visual content on the second digital display on a segment-by-segment basis to establish a coordinated visual experience across the first digital display and the second digital display, wherein the coordinated visual experience is constructed at a graphical user interface that allows a user to specify a synchronization command on a segment-by-segment basis; and
   wherein the slave content player stores alternate visual content and invokes the alternate visual content in response to an absence of a network connection between the slave content player and the synchronization server.

2. The system of claim 1 wherein each of the first visual content and the second visual content comprises a series of compositions, wherein a composition comprises an arrangement of visual content components from different network sources specified by different Uniform Resource Locators, selected from text, images, videos and animations; wherein the master content player and the slave content player play the series of compositions in accordance with the synchronization identifier.

3. The system of claim 1 wherein the master content player and the slave content player each include a pre-programmed address for the synchronization server.

4. The system of claim 3 wherein the second visual content is a program comprising a series of compositions.

5. The system of claim 1 wherein the alternate visual content is selected from a fallback program, a previous program and a next program, wherein each program is a series of compositions.

6. The system of claim 1 wherein the master content player coordinates the publication of synchronization commands in response to dynamic input.

7. The system of claim 6 wherein the dynamic input is from a sensor.

8. The system of claim 6 wherein the dynamic input is from a digital device.

9. The system of claim 6 wherein the dynamic input is a monitored parameter on a networked device.

10. The system of claim 1 wherein the synchronization server re-synchronizes video content for multiple digital displays on a faster-than-frame basis.

11. The system of claim 1 wherein the synchronization server publishes a synchronization status indicative of the proximity of a frame of first visual content on the master content player to a corresponding frame of second visual content on the slave content player.

12. The system of claim 11 wherein the slave content player selectively jumps to a proximate frame in response to the synchronization status.

13. The system of claim 1 wherein the synchronization server supports a cropping tool to allow a user to crop individual segments of a frame and assign the individual segments a common synchronization identification such that the individual segments are simultaneously displayed on the first digital display and the second digital display.

* * * * *